United States Patent
Kim et al.

(10) Patent No.: US 10,566,835 B2
(45) Date of Patent: Feb. 18, 2020

(54) DETECTING POWER OUTAGES USING SMARTPHONE SENSORS

(71) Applicant: INTERNATIONAL BUSINESS MACHINES CORPORATION, Armonk, NY (US)

(72) Inventors: Younghun Kim, White Plains, NY (US); Jayant K. Taneja, Nairobi (KE); Kevin W. Warren, Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 531 days.

(21) Appl. No.: 15/216,741

(22) Filed: Jul. 22, 2016

(65) Prior Publication Data

US 2018/0024205 A1    Jan. 25, 2018

(51) Int. Cl.
   *H02J 13/00* (2006.01)
(52) U.S. Cl.
   CPC .................. *H02J 13/0017* (2013.01)
(58) Field of Classification Search
   CPC ..... G01R 31/40; G05B 15/02; H02J 13/0013; H02J 13/0017; Y02E 60/7807; Y04S 40/12
   See application file for complete search history.

(56) References Cited

U.S. PATENT DOCUMENTS

| | | | | |
|---|---|---|---|---|
| 9,910,102 B2 * | 3/2018 | Stoupis | ................. | G01R 31/40 |
| 10,145,707 B2 * | 12/2018 | Chowdhary | ......... | A61B 5/0022 |
| 2009/0015372 A1 | 1/2009 | Kady | | |
| 2011/0140911 A1 | 6/2011 | Pant et al. | | |
| 2012/0026726 A1 | 2/2012 | Recker et al. | | |
| 2014/0086586 A1 * | 3/2014 | Voutilainen | ........... | H04M 1/003 398/115 |
| 2014/0266177 A1 | 9/2014 | Wisniewski et al. | | |
| 2015/0100166 A1 * | 4/2015 | Baynes | .................. | G05B 15/02 700/278 |
| 2015/0349508 A1 | 12/2015 | Anderson et al. | | |

(Continued)

FOREIGN PATENT DOCUMENTS

| EP | 2410717 B1 | 5/2015 |
|---|---|---|
| WO | 2012033854 A2 | 3/2012 |
| WO | 2012088841 A1 | 5/2012 |

OTHER PUBLICATIONS

Swagatam, "Make a Simple Non-Contact AC Mains Voltage Detector", HotMobile '14, Proceedings of the 15th Workshop on Mobile Computing Systems and Applications, Article 1, ACM New York, NY, ISBN: 978-1-4503-2742-8, Bright Hub Engineering, Jul. 14, 2010, pp. 1-6.

(Continued)

*Primary Examiner* — Mohammed Shamsuzzaman
(74) *Attorney, Agent, or Firm* — Kristofer L. Haggerty

(57) ABSTRACT

Detecting an outage in an alternating current (AC) electrical network. One or more time-stamped and location-stamped data packets, each data packet including magnetic sensor data collected by one or more non-contact magnetic sensors in a mobile device in proximity to the AC electrical network are received. Based on the magnetic sensor data, it is determined that an outage exists in the AC electrical network.

20 Claims, 10 Drawing Sheets

(56) References Cited

U.S. PATENT DOCUMENTS

2016/0252562 A1* 9/2016 Biswas .................. G01R 33/00
                                                              324/764.01
2016/0285265 A1* 9/2016 Lin ........................ H02J 3/006

OTHER PUBLICATIONS

Kajstura et al., "Application of the Electrical Network Frequency (ENF) Criterion a case of a digital recording", Elsevier Forensic Science International 155, Jun. 18, 2004, pp. 165-171.

Klugman et al., "Grid Watch: Mapping Blackouts with Smart Phones", Proceeding HotMobile '14, Proceedings of the 15th Workshop on Mobile Computing Systems and Applications, Article 1, ACM New York, NY Feb. 26-27, 2014, pp. 1-6.

Kuphaldt, "Lessons in Electric Circuits, vol. II—AC", Sixth Edition, Last update, Jul. 25, 2007, pp. 1-47.

Li et al., "Emerging WiFi Direct technique in home area networks for Smart Grid: Power consumption and outage performance", Elsevier Ad Hoc Networks, Oct. 9, 2013, pp. 1-8.

All About Circuits, "Frequency and Phase Measurement", Printed on May 23, 2016, pp. 1-2.

Lu et al., "A GPS-free Power Grid Monitoring System over Mobile Platforms", 2015 IEEE, pp. 1-5.

Lu et al., "Power Grid Frequency Monitoring over Mobile Platforms", 2014 IEEE International Conference on Smart Grid Communications, pp. 1-6.

Mell et al., "The NIST Definition of Cloud Computing", National Institute of Standards and Technology, Special Publication 800-145, Sep. 2011, pp. 1-7.

* cited by examiner

DETECTING POWER OUTAGES USING SMARTPHONE SENSORS

BACKGROUND

The present invention relates generally to the field of electrical power management, and more particularly to detecting power outages using smartphones.

In geographic areas where the electrical grid is fragile, unscheduled power outages may be a frequent occurrence, which electric utility companies may be slow to detect due to limited sensing. In many cases, an electric utility's primary method for learning about outages is through customer phone calls to the utility's service center. However, customers with landline or voice over Internet (VoIP) phones may be prevented from reporting an outage due to the power failure, and users of mobile phones may not be relied upon to report an outage in a timely fashion, particularly when an outage occurs at night.

Various methods have been employed or proposed for monitoring the quality of an electrical grid and detecting power outages, including using smart meters and/or phasor measurement units (PMUs), and making use of certain smartphone features.

A smart meter is an electronic device that records consumption of electric energy, generally at consumer sites, in set time intervals, and communicates that information periodically to a utility for monitoring and billing. Smart meters enable two-way communication between the meter and the central system. Smart meters may employ real-time or near real-time sensors to provide power outage notification and power quality monitoring. However, smart meters are costly and their deployment is limited in many locales. Moreover, they may themselves rely on the power grid for communicating, making them susceptible to grid failures.

A PMU is a device that measures the electrical waves in an electrical grid using a common time source such as GPS for synchronization. Time synchronization allows synchronized real-time measurements of multiple remote measurement points on the grid. The resulting measurement is known as a synchrophasor. In typical applications, phasor measurement units are sampled from widely dispersed locations in the power system network and synchronized from the common time source. PMUs can be used to assess system conditions, however, PMUs are generally used to measure voltages and currents at generating plants or at critical substations on a power grid, rather than at consumer sites. As with smart meters, PMUs are costly and their deployment is often limited. Moreover, they may rely on phone lines and the power grid for communicating, making them susceptible to grid failures.

Smartphones have also been proposed as a means for detecting and reporting power outages. For example, a smartphone connected to a charger may sense a loss of power without subsequent motion (indicating detachment from the power source) and report this loss, via an installed app, to a central location. Or a smartphone microphone may check for the presence of an audible "hum" generated by AC mains. These methods may be unreliable and impractical under real-world conditions.

A technique that allows power grid operators to quickly detect outages and other disturbances in the electrical grid would be advantageous in that it would reduce the time required to restore reliable power, which would improve the quality of service and increase customer satisfaction, as well as reducing costs.

SUMMARY

Embodiments of the present invention disclose a computer-implemented method, computer program product, and system for detecting an outage in an alternating current (AC) electrical network using non-contact magnetic sensors of a mobile device. This is advantageous in that no direct voltage measurements or direct contact with wires of the electrical grid is necessary.

In an embodiment of the invention, one or more time-stamped and location-stamped data packets, each data packet including magnetic sensor data collected by one or more non-contact magnetic sensors in a mobile device in proximity to the AC electrical network, are received. Based on the magnetic sensor data, it is determined that an outage exists in the AC electrical network. This has the advantage of providing an automated method for detecting a power outage which is reliable, inexpensive, and not dependent on power from the electrical network.

In an embodiment of the invention, a mobile device receives magnetic sensor data from one or more axes of the mobile device. The magnetic sensor data constitutes a time series of magnetic field strength readings of an ambient magnetic field sampled at a constant frequency. Based on frequency analysis and phase analysis of the magnetic sensor data, an outage in the AC electrical network is detected. This has the advantage that mobile devices with such magnetic sensors are ubiquitous and software for performing the frequency and phase analysis is readily available.

In another embodiment of the invention, time-stamped and location-stamped data packets of magnetic sensor data are received from multiple mobile devices in proximity to an AC electrical network. The magnetic sensor data may constitute a time series of magnetic field strength readings, in one or more axes of the mobile device, of an ambient magnetic field sampled at a constant frequency. Based on frequency analysis and phase analysis of the packets of magnetic sensor data, an outage in the AC electrical network may be detected and remedial action initiated. This may be advantageous in that common AC electrical networks exhibit characteristic signatures related to frequency and phase shifts, which are readily discernable by frequency and phase analysis.

In another embodiment of the invention, multiple reports of outages are received by a grid management system associated with an AC electrical grid operator. The outage reports may be weighted according to reliability. The outage reports are clustered, based on geographic location and/or topology of the AC electrical network, a density of outage reports in each cluster is determined, and the existence of an outage in AC electrical network is determined, based on the density exceeding a predetermined threshold. Based on the outage reports, remedial action to restore power may be initiated. This has the advantage that the location and extent of a power outage may be automatically determined. Moreover, once remedial action has been initiated, the grid management system may, based on subsequent outage reports, verify that power has been restored before service crews have left the area of the outage. This verification may reduce the likelihood of dispatching a service crew to restore service to customers whose power has already been restored.

The above features and advantages and other features and advantages of the present invention are readily apparent

DETAILED DESCRIPTION

Figure 1:
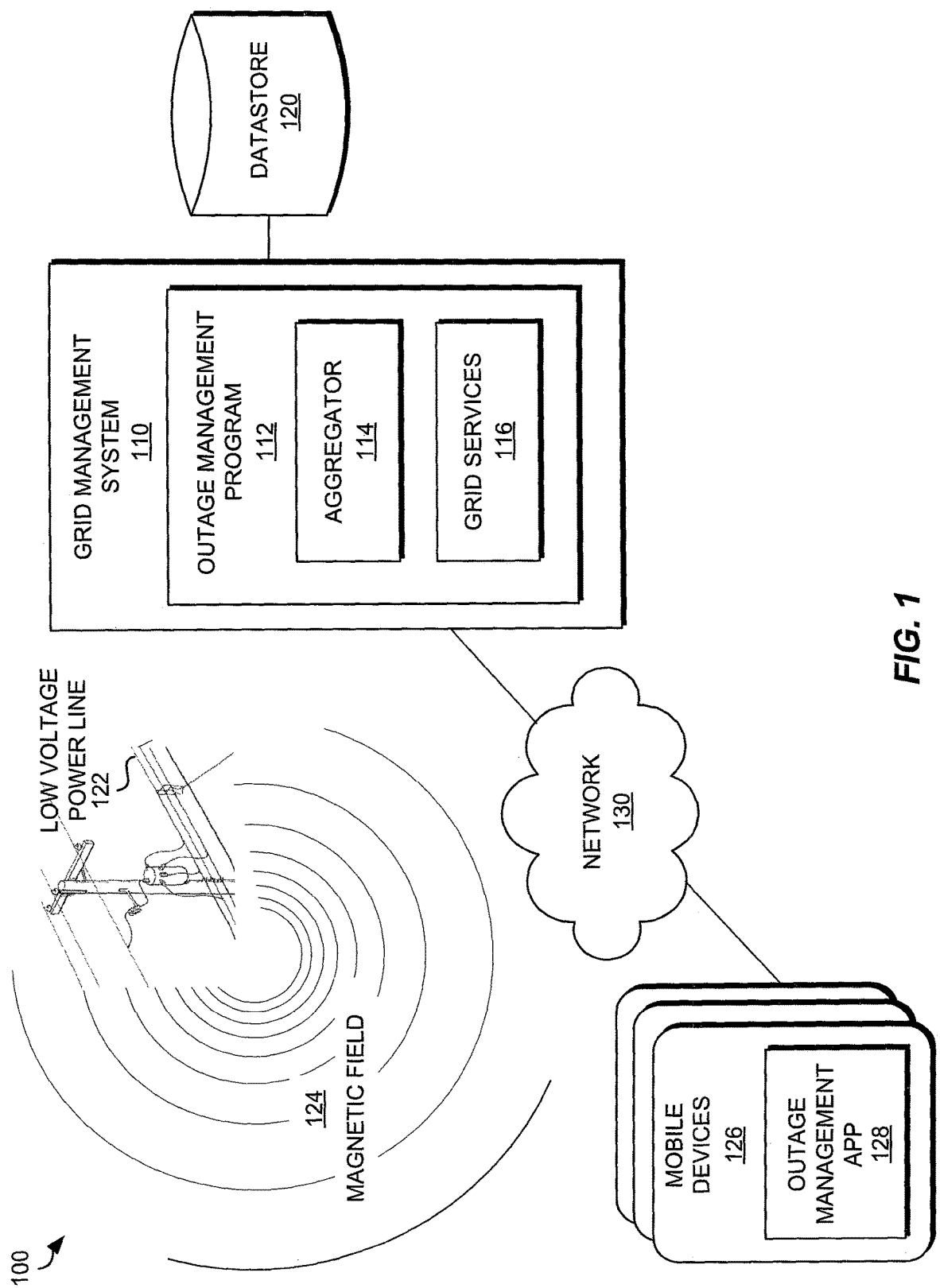
FIG. 1 is a schematic diagram of a power outage detection environment, in accordance with an embodiment of the present invention.

Embodiments of the present invention disclose a computer-implemented method, computer program product, and system for automatically detecting and reporting power outages in an alternating current (AC) electrical network using built-in sensors in mobile devices. No direct voltage measurements or direct contact with wires of the electrical grid is required. Magnetic sensors in one or more mobile devices receive magnetic sensor data, which may be analyzed to determine, based on typical signatures of the AC network, that a power outage exists. An aggregator in a grid management system may receive multiple reports of power outages and determine, based on time and location information of mobile devices reporting an outage, whether an outage in the AC network actually exists and, if so, its location and extent.

In addition to a microphone, modern smartphones and other mobile devices may be equipped with a variety of advanced sensors, including location sensors such as a Global Positioning System (GPS) device, orientation sensors such as a gyroscope, motion sensors such as an accelerometer, and a magnetometer, which measures magnetic field strength, or intensity.

The magnetometer in a tablet or smartphone typically includes three magnetic field sensors, positioned perpendicular relative to each other, that detect the Earth's magnetic field along three perpendicular axes. A voltage is generated, which is proportional to the strength and polarity of the magnetic field along the axes. The voltage is then converted to digital signal representing the magnetic field intensity. The magnetometer may be enclosed in an electronic chip that incorporates another sensor, typically a built-in accelerometer, that helps to correct the raw magnetic measurements using tilt information.

Both Google® and Apple® provide software development kits (SDKs) and application programming interfaces (APIs) for developing apps that make use of data from magnetometers and other built-in sensors in mobile devices running Android™ and iOS™ operating systems, respectively. In addition, the MATLAB® computing environment supports the acquisition and processing of data from the built-in sensors in iOS and Android mobile devices.

Android is an open-source operating system, developed by Google, Inc., that is installed on various mobile devices and may include additional proprietary code. The current version is version 6. iOS™ is a mobile operating system created and developed Apple, Inc., and distributed exclusively for Apple hardware. The current version is iOS 9. A number of other, less common, mobile operating systems are also available.

As used herein, all trademarks and registered trademarks are the property of their respective owners. The term(s) "Android", "Apple", "MATLAB", "iOS", and the like may be subject to trademark rights in various jurisdictions throughout the world and are used here only in reference to the products or services properly denominated by the marks to the extent that such trademark rights may exist.

Various methods for locating a mobile device may be available. For example, localization may be effected via multilateration of radio signals between several radio towers of a mobile network and the device, using the Global System for Mobile Communications (GSM), or via GPS. In addition, WiFi-based localization may be accomplished using details of a small number of static WiFi access points or routers detected by the mobile device. Multilateration is a navigation technique based on the measurement of the difference in distance to two stations at known locations that broadcast signals at known times. To locate a mobile device using multilateration of radio signals, the device emits a roaming signal to contact nearby antenna towers. The process does not require an active call. Mobile devices in a GSM cellular network may rely on the device's signal strength to nearby antenna masts for localization.

Mobile devices in a network may receive an accurate local time in a number of ways, including via the GPS pulse-per-second (PPS) signal, from a Network Time Protocol (NTP) server, over a CDMA cellular phone network, from a precision time protocol (PTP) signal, or from a 4G long term evolution (LTE) primary synchronization signal (PSS). NTP is a networking protocol for clock synchronization between computer systems over packet-switched, variable-latency data networks. NTP is used to synchronize participating computers to within a few milliseconds of Coordinated Universal Time (UTC). NTP can usually maintain time to within tens of milliseconds over the Internet. PTP is also a protocol used to synchronize clocks in a computer network. PTP is designed as an alternative to NTP and GPS and may provide an accuracy beyond that attainable using NTP. It may be employed, for example, where GPS signals are inaccessible.

An electrical grid is a network for delivering electricity from suppliers to consumers. The elements of the network include generating stations that produce electrical power, high-voltage transmission lines that may carry power from distant sources to demand centers, and distribution lines that connect individual customers. Electric power generated by power stations is stepped up to a higher voltage and connected to a bulk power transmission network, which may move the power long distances until it reaches a wholesale customer, typically the company that owns the local electric power distribution network. On arrival at a substation, the power is stepped down from a transmission level voltage to a distribution level voltage, after which it is distributed via the distribution wiring. Upon arrival at a service location, the power is stepped down again from the distribution voltage to the required service voltage. The term substation is generally used to denote a node in an electrical network where voltage is transformed from high to low, or low to high, or where other important tasks are performed. Between the generating station and consumers, electric power may flow through multiple substations at different voltage levels.

Substations generally have switching, protection, and control equipment, as well as transformers. Circuit breakers and/or fuses are used to interrupt any short circuits or overload currents that may occur in the network and for the protection of distribution circuits.

Power outages may occur at any point in the electrical network, including power plants, substations, and along transmission or distribution lines. Outages due to downed power lines/pylons or equipment failure may be caused, for example, by severe weather events, motor vehicle accidents, incidents involving animals, or power surges.

Mains electricity is the general-purpose AC electric power that is transmitted in an electric power grid from a power plant and distributed to end users. The two principal properties of the electric power supply, voltage and frequency, may differ between regions. A voltage of nominally 230 V and a dominant frequency of 50 Hz is used in Europe, most of Africa, most of Asia, most of South America, and Australia. In North America, the most common voltage is 120 V and the dominant frequency is 60 Hz. In addition, single-phase or three-phase power is most commonly used today.

Single-phase electric power is the distribution of alternating current electric power using a system in which all the voltages of the supply vary in unison. Single-phase distribution is used when loads are mostly lighting, heating, and small electric motors. Dual phase or split phase power denotes single phase power with a two-wire AC power circuit. In the US, this is the standard household power arrangement with two 120V power wires 180 degrees out of phase with one another. This provides the option of connecting high power loads to the 240 V power circuit and low power loads to the 120 V power circuit.

Three-phase electric power is a common method of AC electric power generation, transmission, and distribution. It is the most common method used by electrical grids worldwide to transfer power. It is also used to power large motors and other heavy loads. In a three-phase system, the currents in each conductor reach their peak values sequentially, in each cycle, with peaks shifted in phase 120 degrees.

The dominant frequency of an AC power grid may vary slightly from its nominal value. AC power grid operators typically regulate the AC frequency so that the power quality is ensured. Over the course of a day, the average frequency is maintained at the nominal value within a few hundred parts per million. For example, in continental Europe, the target frequency is adjusted by up to ±0.02% from 50 Hz as needed, to ensure a long-term frequency average of 4,320,000 cycles per day. Frequency of the system may also vary as load and generation in the network change.

In a normal alternating current power system, the voltage oscillates sinusoidally at a specific frequency, typically 50 or 60 hertz. This oscillation is mirrored in the magnitude of the resulting magnetic field. When a linear electrical load is connected to the system, it draws a sinusoidal current at the same frequency as the voltage (though usually not in phase with the voltage). However, a nonlinear load connected to a power system draws a current that is not necessarily sinusoidal, resulting in distortion of the current waveform.

Examples of nonlinear loads include rectifiers, transistors, office equipment such as computers and printers, fluorescent lights, battery chargers, and variable speed drives.

The current waveform resulting from a nonlinear load can be quite complex, depending on the type of load and its interaction with other components of the system. Nonetheless, Fourier series analysis may be used to decompose the current waveform into a series of simple sinusoids, which start at the power system fundamental frequency and occur at integer multiples, or harmonics, of the fundamental frequency. For example, the third-order harmonic is the third multiple of the fundamental frequency. These harmonics can sometimes propagate outwards from nonlinear loads, causing distortions elsewhere in the power system. Such harmonic distortion may degrade the level of power quality and its efficiency.

Total harmonic distortion (THD) is a common measurement of the level of harmonic distortion present in a power system. THD is defined as the ratio of total harmonics to the value at fundamental frequency:

$$THD = \frac{\sqrt{V_2^2 + V_3^2 + V_4^2 + \ldots + V_n^2}}{V_1}$$

where $V_n$ is the RMS voltage of nth harmonic and n=1 represents the fundamental frequency.

As mentioned, electric currents, including those in power lines, household wiring, and electric appliances, generate magnetic fields. The intensity of the magnetic field produced by an electric current is proportional to the current flow. The intensity, or strength, of a magnetic field is typically measured in teslas or microteslas (µT). For example, the intensity of the Earth's natural geomagnetic field varies over the surface of the planet roughly between 25 µT and 65 µT. The terms magnetic field strength and magnetic field intensity are used interchangeably in what follows.

A goal of signal processing is to reconstruct a signal from a series of sampling measurements, or samples. In general, this task is impossible because there is no way to reconstruct a continuous signal for the times that the signal is not measured. Nevertheless, with prior knowledge or assumptions about the signal, it is possible to reconstruct a signal from a series of measurements.

Bandwidth is the difference between the upper and lower frequencies in a continuous set of frequencies of an analog signal. It is typically measured in hertz, and may sometimes refer to passband bandwidth or to baseband bandwidth, depending on the context. Passband bandwidth is the difference between the upper and lower cutoff frequencies of, for example, a bandpass filter, a communication channel, or a signal spectrum. In the case of a low-pass filter or baseband signal, the bandwidth is equal to its upper cutoff frequency.

One version of the Nyquist Theorem (also known as the Nyquist-Shannon Theorem) states that an analog, or continuous, signal must be sampled at least twice as fast as the maximum frequency component in the signal to accurately reconstruct its waveform. A more general version states that the signal must be sampled at least twice as fast as the bandwidth of the signal to reconstruct its waveform; otherwise, the high-frequency content will alias at a frequency inside the spectrum of interest (the passband). The minimum required sampling frequency, according to the Nyquist-Shannon Theorem, is the Nyquist frequency, which is twice the highest frequency of interest in the input signal. The Nyquist sampling frequency is a theoretical minimum sampling frequency. In practice, a user may use the highest practical sampling frequency, to give the best possible representation of the measured signal in the time domain. Sampling at frequencies above the Nyquist frequency is called oversampling. Oversampling may also be combined with techniques such as decimation or averaging to reconstruct a signal. The use of a sampling frequency that is less than twice the maximum frequency component in the signal is often called undersampling. Undersampling may also be referred to as bandpass sampling, harmonic sampling, or super-Nyquist sampling.

Even when a bandpass-filtered signal is sampled at a rate less than twice the bandwidth, it still may be possible to reconstruct it. For example, compressed sensing (also known as compressive sensing, compressive sampling, or sparse sampling) is a signal processing technique for efficiently reconstructing such an undersampled signal. It is based on the principle that, through optimization, the known sparsity of a signal can be exploited to recover the signal from far fewer samples than are required by the Nyquist-Shannon sampling theorem. Alternatives to compressive sensing for reconstructing sparse, undersampled signals include super-resolution and filter diagonalization.

Another way to reconstruct a signal with a known frequency is to solve a numerical optimization problem, where the signal reconstruction seeks to fill gaps between sampled data, assuming the existence of a particular frequency. For example, the reconstruction routine may assume that there are missing values between samples. Signal reconstruction based on this numerical optimization framework calculates optimal values for the missing (i.e., unsampled) values by minimizing the reconstruction error, based on the existence of the particular frequency component.

In embodiments of the present invention, a built-in magnetometer in a smartphone or other mobile device is polled at a constant sampling frequency (i.e., at uniformly spaced, discrete instants) to generate a time series of magnetic field strength readings, or samples, of an ambient magnetic field. By performing a Fourier analysis on the samples to generate a frequency spectrum and a phase spectrum, properties of the ambient magnetic field may be inferred. In particular, it may be determined whether the typical signatures of AC electrical current are present. These signatures may include a fundamental frequency near the dominant frequency of the electrical grid (e.g., 50 or 60 Hz) and a phase shift typical of a single-phase or three-phase system (e.g., a 120° or 180° phase shift). If a nearby AC electrical network is detected, its quality may also be assessed, for example based on THD.

In various embodiments of the invention, a bandpass or low pass filter may be applied to the samples in order to isolate the frequency band of interest before performing Fourier analysis. In other embodiments, a bandpass or low pass filter may be applied before sampling. According to the Nyquist-Shannon theorem, such filtering may allow for accurate signal reproduction at a lower sampling frequency.

In other embodiments, the ambient magnetic field may be undersampled and additional values may be calculated using a signal reconstruction method, as described above, in order to generate data on which a Fourier analysis may yield the desired frequency and phase information.

FIG. 1 is a schematic diagram of a power outage detection environment 100, in accordance with an embodiment of the present invention. Power outage detection environment 100 includes grid management system 110, mobile devices 126, and datastore 120, all interconnected over a network 130. Additionally, power outage detection environment 100 includes low voltage power line 122 and resultant magnetic field 124. Grid management system 110 represents the computing environment or platform that hosts outage management program 112. In various embodiments, grid management system 110 may be a server, laptop computer, netbook computer, personal computer (PC), desktop computer, or any programmable electronic device capable of hosting outage management program 112, in accordance with embodiments of the invention. Grid management system 110 may include internal and external hardware components, as depicted and described in further detail below with reference to FIG. 8. In other embodiments, grid management system 110 may be implemented in a cloud computing environment, as described below in relation to FIGS. 9 and 10. Each of mobile devices 126 may be a smartphone, tablet, or other mobile device equipped with at least a magnetic sensor and mechanisms for providing a local time and location, and capable of hosting outage management app 128. Mobile devices 126 may include internal and external hardware components, as depicted and described in further detail below with reference to FIG. 5.

In an exemplary embodiment of the invention, grid management system 110 includes outage management program 112 and datastore 120.

In an exemplary embodiment of the invention, each of mobile devices 126 includes outage management app 128.

Figure 8:
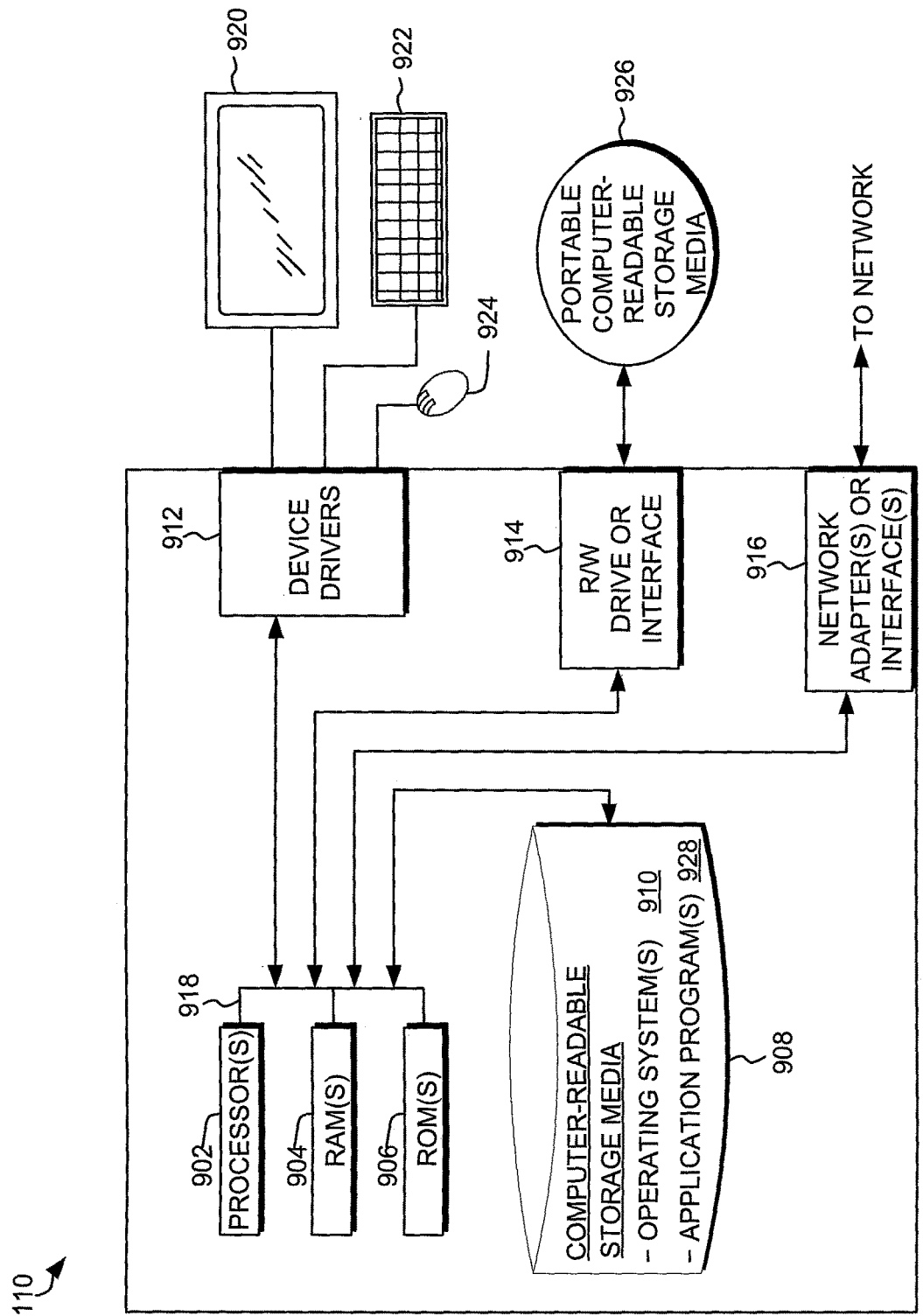
FIG. 8 is a functional block diagram illustrating a data processing environment, in accordance with an embodiment of the present invention.

Datastore 120 represents a store of data that may be utilized by outage management program 112 to assess the presence and scope, or severity, of a power outage, based on data received from mobile devices 126. The data may include time- and location-stamped magnetic sensor data or outage reports received from multiple mobile devices. Datastore 120 may reside, for example, on non-transitory computer readable storage media 908 (FIG. 8).

Outage management program 112, in an exemplary embodiment of the invention, operates generally to receive and aggregate outage reports from mobile devices 126, determine the location and extent of an outage, based on the number and location of the outage reports, and knowledge of the grid topology, and initiate remedial action, if required, based on the severity of the outage. For example, a service crew may be dispatched to restore power. Once remedial action has been initiated, outage management program 112 may, based on subsequent outage reports, verify that power has been restored before service crews have left the area of the outage. This may reduce the likelihood of dispatching a service crew to restore service to customers whose power has already been restored. Outage management program 112 may include aggregator module 114 and grid services module 116.

Aggregator module 114 operates generally to receive time- and location-stamped reports from mobile devices 126 at multiple locations concerning the state of an AC network, according to an embodiment of the invention. Based on the times and locations of the reports, aggregator module 114 may determine that an outage or other disturbance in the electrical network has occurred, and its extent. In various embodiments, aggregator module 114 may use knowledge of the grid topology to localize the outage to an element of the electrical grid, such as a particular power plant, substation, or transmission line. For example, aggregator module 114 may apply a consensus algorithm, or require that the density of reports of disturbances from a geographic region of the service area exceed some threshold, in order to conclude that a significant disturbance in the grid has occurred. Alternatively, aggregator module 114 may use a clustering algorithm to identify possible clusters of local disturbances that may indicate a more widespread problem. Aggregator module 114 may assess the severity of the disturbance based on the number and extent of reports of local disturbances, and if a disturbance of sufficient severity has occurred, aggregator module 114 may instruct grid services module 116 to take remedial action.

In practice, some outage reports received from a mobile device may be unreliable if, for example, the signal received by its magnetic sensor is weak. This may occur, for example, if the mobile device is too far, or shielded, from an AC power line, or too close to an interfering appliance. Sensors in mobile devices may also malfunction. Aggregation/consensus algorithms attempt to reduce uncertainty associated with outage reports and achieve a consensus as to the existence of an actual outage.

As used herein, aggregation, or data aggregation, refers to a process in which data from multiple sources is combined with the intent to prepare the combined data for data processing. Aggregation may be combined with clustering, in which data with similar characteristics are grouped, for example based on distance. A consensus algorithm refers to the process of agreeing on one result based on multiple inputs, sometimes of varying reliability. Various aggregation, clustering, and consensus algorithms are currently known and practiced.

In an embodiment of the invention, aggregator module 114 may weight reports of outages in aggregating outage reports to reach a consensus on whether an outage has occurred. For example, locations that have in the past reported a local outage that was not determined to correspond to an actual outage may be down-weighted; locations that have correctly identified an actual outage in the past may be up-weighted. The weights may depend on the number or percentage of correct outage reports that have been received from a location, or on some other measure of reliability.

Grid services module 116 operates generally to monitor the operation of the electrical grid and act to maintain or restore the provision of power, in accordance with an embodiment of the invention. For example, upon determination that a power outage has occurred in a geographic region serviced by the AC electrical network, grid services module 116 may report the outage to a grid operator and/or cause a service crew to be dispatched to restore power.

Outage management app 128, in an embodiment of the invention, operates to receive magnetic sensor data from a magnetic sensor in its host mobile device, of the mobile devices 126, perform a Fourier transform of the magnetic sensor data to determine whether an outage has occurred. Outage management app 128 may poll a built-in magnetic sensor, e.g., one of sensors 528 (FIG. 5), at a predetermined, constant frequency, to sample the magnetic field strength of an ambient magnetic field. Outage management app 128 may perform a Fourier transform of the samples to infer the presence of a nearby AC electrical network. For example, outage management app 128 may determine whether the amplitude of the component of the transformed signal corresponding to the AC fundamental frequency is greater than a predetermined threshold value. Outage management app 128 may additionally perform phase analysis on the transformed signal to detect phase components compatible with single-phase, split phase, or three-phase current, depending on whichever is in use, based on a comparison of the amplitude of the appropriate components of the phase spectrum to a predetermined threshold. Outage management app 128 may determine that a local outage exists if one or more of the threshold comparisons for frequency and/or phase shift pattern, as described above, fail.

In another embodiment of the invention, outage management app 128 operates to receive magnetic sensor data from a magnetic sensor in its host mobile device, of mobile devices 126, and send a data packet to aggregator module 114 of outage management program 112, which includes the magnetic sensor data, a current system time, and the geographic location of the mobile device. Aggregator module 114 may receive the data packets and store them in datastore 120. Aggregator module 114 may process each data packet, as described above, to determine, based on a Fourier transform of the magnetic sensor data, whether an outage has occurred at the geographic location associated with the data packet. Aggregator module 114 may store an outage report in datastore 120, which includes a summary of the processing. Based on the stored reports, aggregator module 114 may determine, as described above, that an outage or other disturbance in the electrical network has occurred, and its extent.

In embodiments of the invention, an intelligent sampling strategy may be employed that reduces power consumption of the mobile device. For example, periodic burst sampling may be used to collect and process magnetic sensor data, between intervals in which the mobile device does not sample the AC electromagnetic field. In this way, battery power in the mobile device may be conserved. Burst sampling refers to a sampling technique in which a hardware device samples data at a high rate, the burst rate, while a processor stores and reports the data at another, lower rate, called the sample or throughput rate. Burst sampling is an example of oversampling. One benefit of burst sampling is the ability to evaluate and apply all the data received, rather than having to discard part of it.

The forgoing, non-limiting, examples are merely illustrative examples of methods of detecting a disturbance in an electrical grid, which may be used in embodiments of the present invention. Others are contemplated.

Figure 2:
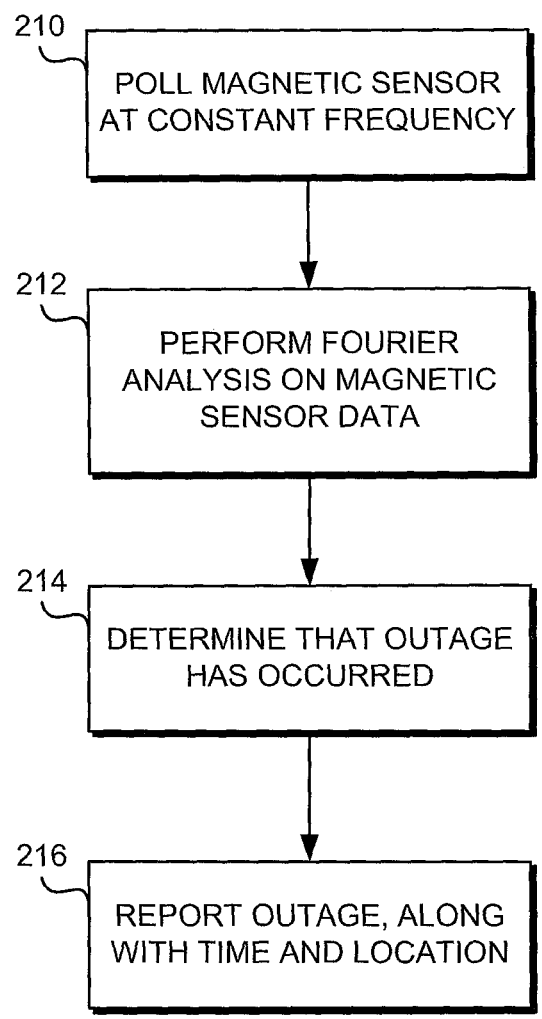
FIG. 2 is a flowchart depicting operational steps performed by a mobile device in executing an outage management app, in accordance with an embodiment of the present invention.

FIG. 2 is a flowchart depicting various operational steps performed by any of mobile devices 126 in executing outage management app 128, in accordance with an embodiment of the invention. Outage management app 128 polls a built-in magnetic sensor, e.g., one of sensors 528 (FIG. 5), at a predetermined, constant frequency to sample the magnetic field strength of an ambient magnetic field (step 210). Outage management app 128 performs a Fourier analysis of the samples (step 212). Based on the results of the Fourier analysis, for example the frequency and phase spectrum of the analyzed signal, outage management app 128 determines that an outage in a nearby AC electrical network has occurred (step 214). For example, outage management app 128 may infer that an outage has occurred if the amplitude of the frequency component of the analyzed signal corresponding to the dominant frequency is less than a predetermined threshold value and the typical signatures of a split phase or three-phase system, as described above, are not present. Outage management app 128 reports the outage, along with a current system time and geographic location of the mobile device (step 216).

Alternatively, outage management app 128 may assess the quality of the AC current, based on the magnetic sensor data, via a quality metric such as THD, and report a disturbance in the AC network if the quality is deficient.

Figure 3:
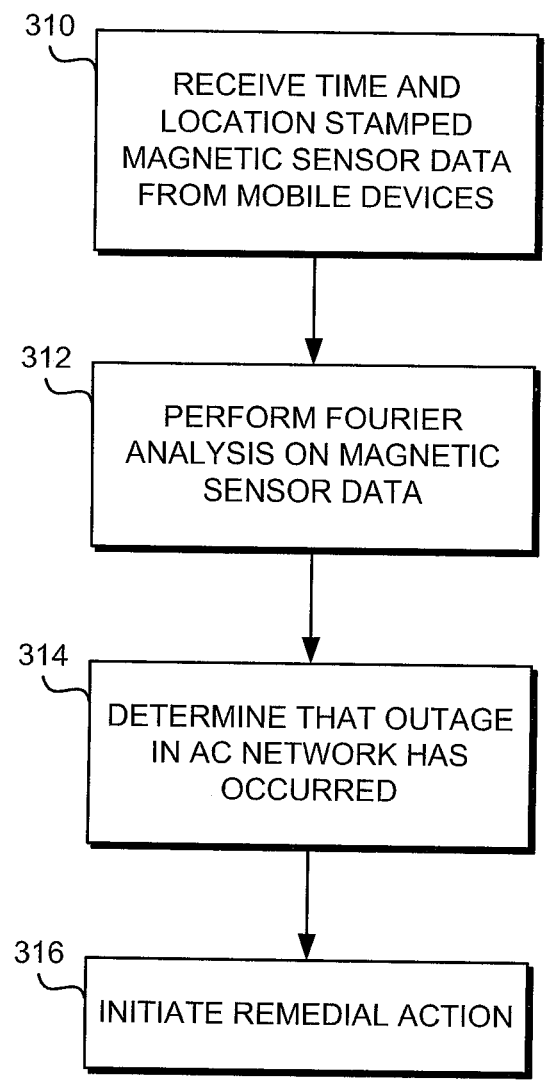
FIG. 3 is a flowchart depicting operational steps performed by an outage management system in executing an outage management program, in accordance with an embodiment of the present invention.

FIG. 3 is a flowchart depicting various operational steps performed by grid management system 110 in executing outage management program 112, in accordance with one embodiment of the invention. Outage management program 112 receives time- and location-stamped packets of magnetic sensor data from mobile devices in proximity to an AC electrical network (step 310). The data packets from each mobile device may include magnetic field strength readings generated by polling a built-in magnetometer of the mobile device at a constant, predetermined sampling frequency, as well as a current system time and a geographic location of the mobile device. Aggregator module 114 performs a Fourier analysis on the magnetic sensor data in each data packet (step 312) in order to determine whether the data indicates a local outage in the AC power supply. Based on the results of the Fourier analysis, aggregator module 114 determines that an outage has occurred in the AC electrical network (step 314) and causes grid services module 116 to initiate remedial action (step 316).

Alternatively, outage management program 112 may assess the quality of the AC current, based on the received magnetic sensor data, via a quality metric such as THD, and initiate remedial action if the quality is deficient.

Figure 4:
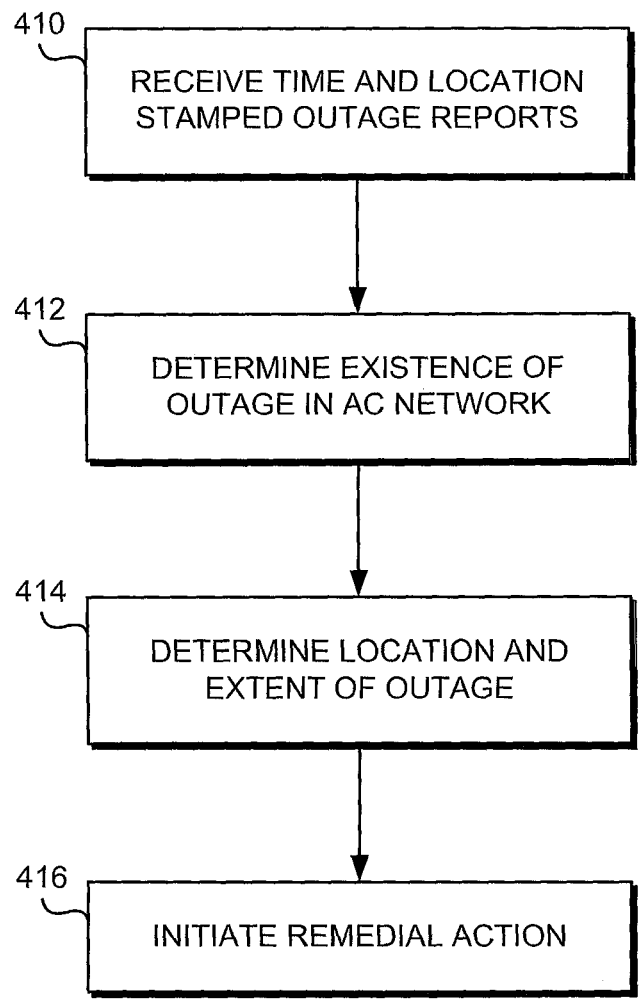
FIG. 4 is another flowchart depicting operational steps performed by an outage management system in executing an outage management program, in accordance with an embodiment of the present invention.

FIG. 4 is a flowchart depicting various operational steps performed by grid management system 110 in executing outage management program 112, in accordance with an embodiment of the invention. Outage management program 112 receives time- and location-stamped outage reports from mobile devices in proximity to an AC electrical network (step 410). Based on the outage reports, aggregator module 114 determines the existence of an outage in the AC network (step 412). Aggregator module 114 determines the location and extent of the outage (step 414) and causes grid services module 116 to initiate remedial action (step 416).

Figure 5:
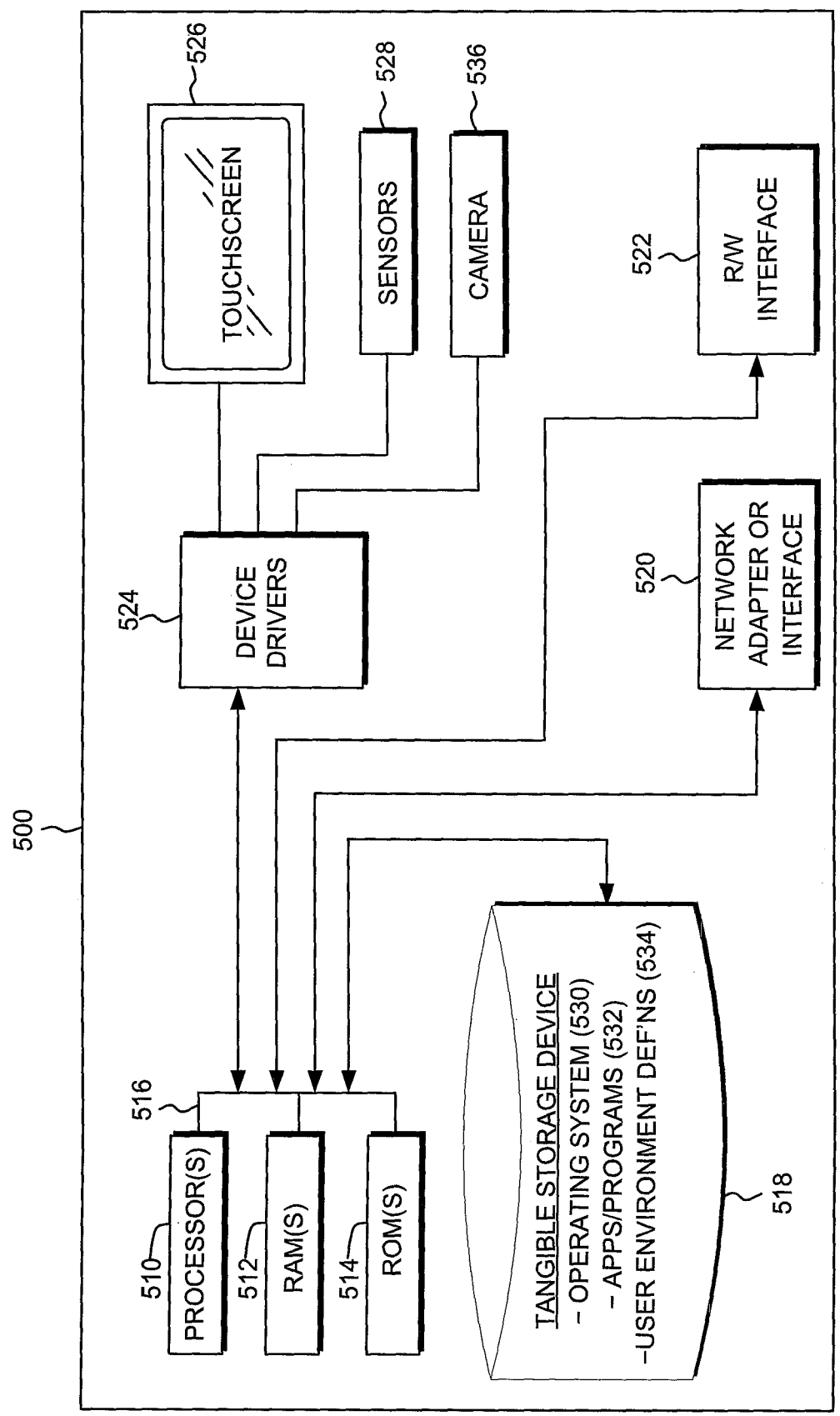
FIG. 5 is a functional block diagram illustrating a mobile device data processing environment, in accordance with an embodiment of the present invention.

FIG. 5 is a block diagram of various components of a mobile device 500, in accordance with an embodiment of the present invention. In an exemplary embodiment, mobile device 500 includes one or more processors 510, one or more computer-readable RAMs 512, one or more computer-readable ROMs 514, and one or more computer-readable tangible storage devices 518 on one or more buses 516. One or more operating systems 530, one or more apps or programs 532, such as outage management app 128, and one or more user environment definitions 534 are stored on the one or more computer-readable tangible storage devices 518 for execution by one or more of the processors 510 via one or more of the RAMs 512 (which typically include cache memory). In the illustrated embodiment, each of the computer-readable tangible storage devices 518, is a semiconductor storage device such as ROM 514, EPROM, flash memory or any other computer-readable tangible storage device that can store a computer program and digital information. Alternatively, each of the computer-readable tangible storage devices 518 is a magnetic disk storage device of an internal hard drive.

Mobile device 500 also includes a read/write (R/W) interface 522, for example, a USB port, to read from and write to external computing devices or one or more portable computer-readable tangible storage devices such as a CD-ROM, DVD, memory stick, magnetic disk, optical disk or semiconductor storage device. The apps and programs 532 and the user environment definitions 534 can be stored on the external computing devices or one or more of the portable computer-readable tangible storage devices, read via the R/W interface 522 and loaded onto the computer-readable tangible storage device 518.

Mobile device 500 also includes a network adapter or interface 520, such as a TCP/IP adapter card or wireless communication adapter (such as a 4G wireless communication adapter using OFDMA technology). The apps and programs 532 and the user environment definitions 534 can be downloaded to mobile device 500 from an external computer or external storage device via a network (for example, a cellular network, the Internet, a local area network, a wide area network, or a wireless network) and network adapter or interface 520. From the network adapter or interface 520, the apps and programs 532 and the user environment definitions 534 are loaded into computer-readable tangible storage device 518.

Mobile device 500 also includes a touchscreen 526, a camera 536, sensors 528, for example, touchscreen sensors and a magnetometer, and device drivers 524, to interface to touchscreen 526 for imaging, to sensors 528 for pressure sensing of alphanumeric character entry and user selections and for detecting magnetic flux density and polarity. The device drivers 524, R/W interface 522 and network adapter or interface 520 comprise hardware and software (stored in computer-readable tangible storage device 518 and/or ROM 514).

Figure 6:
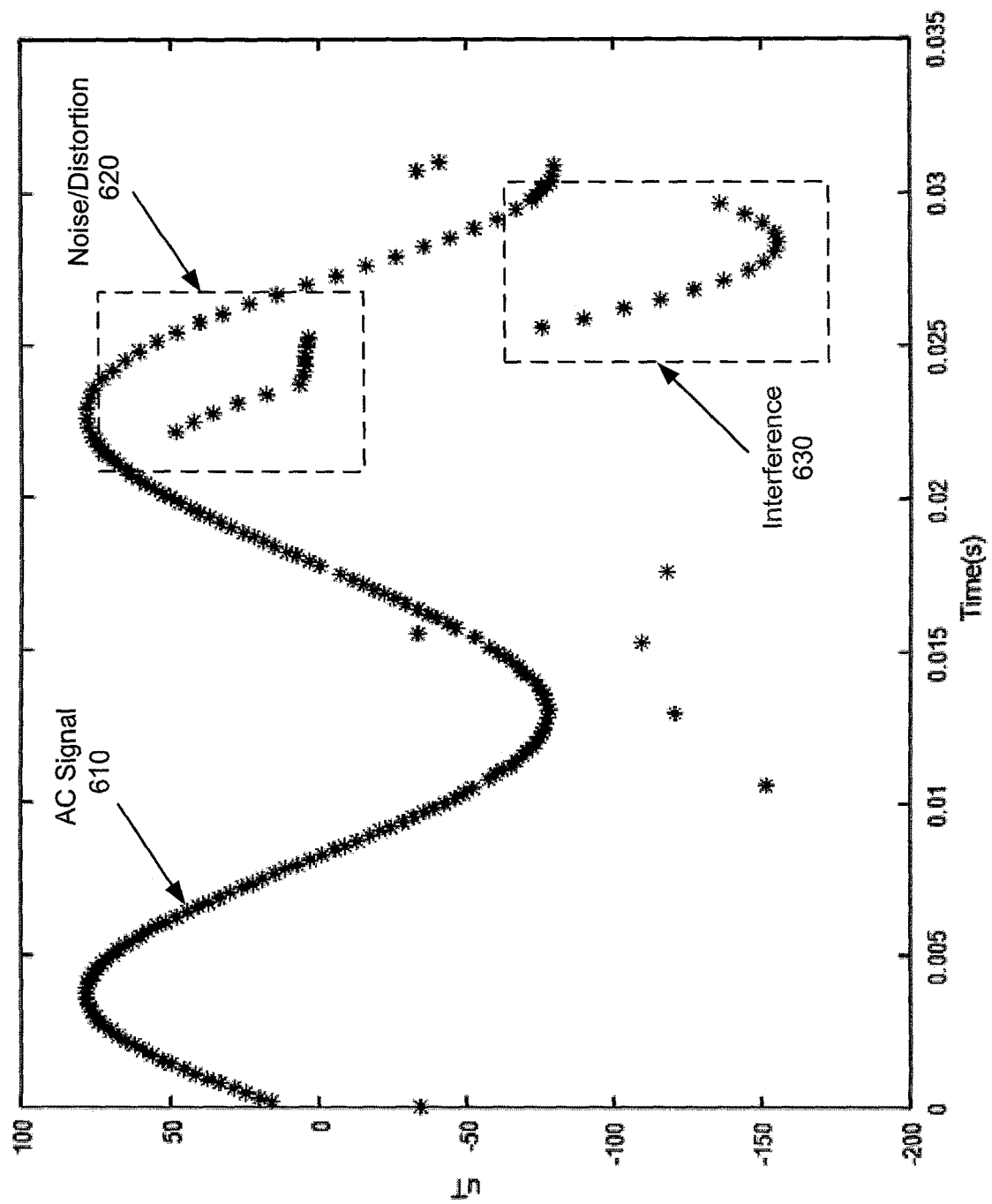
FIG. 6 is a graph of time versus magnetic field intensity due to the presence of an AC electrical network and a household device, in accordance with an embodiment of the present invention.

FIG. 6 is a graphical representation of a sampled magnetic field in the presence of a nearby AC electrical network and near a running household appliance. The data that follows the main sinusoidal curve represents an AC signal 610 resulting from fluctuations in the ambient magnetic field. This data may result, for example, from polling one axis of a built-in magnetometer of a mobile device at a high rate. The plot shows magnetic field strength in microteslas ($\mu T$) versus time (in seconds). Circuits in the household appliance may also result in a sinusoidal interference pattern 630, as well as causing noise and distortion 620 in the AC signal.

Figure 7:
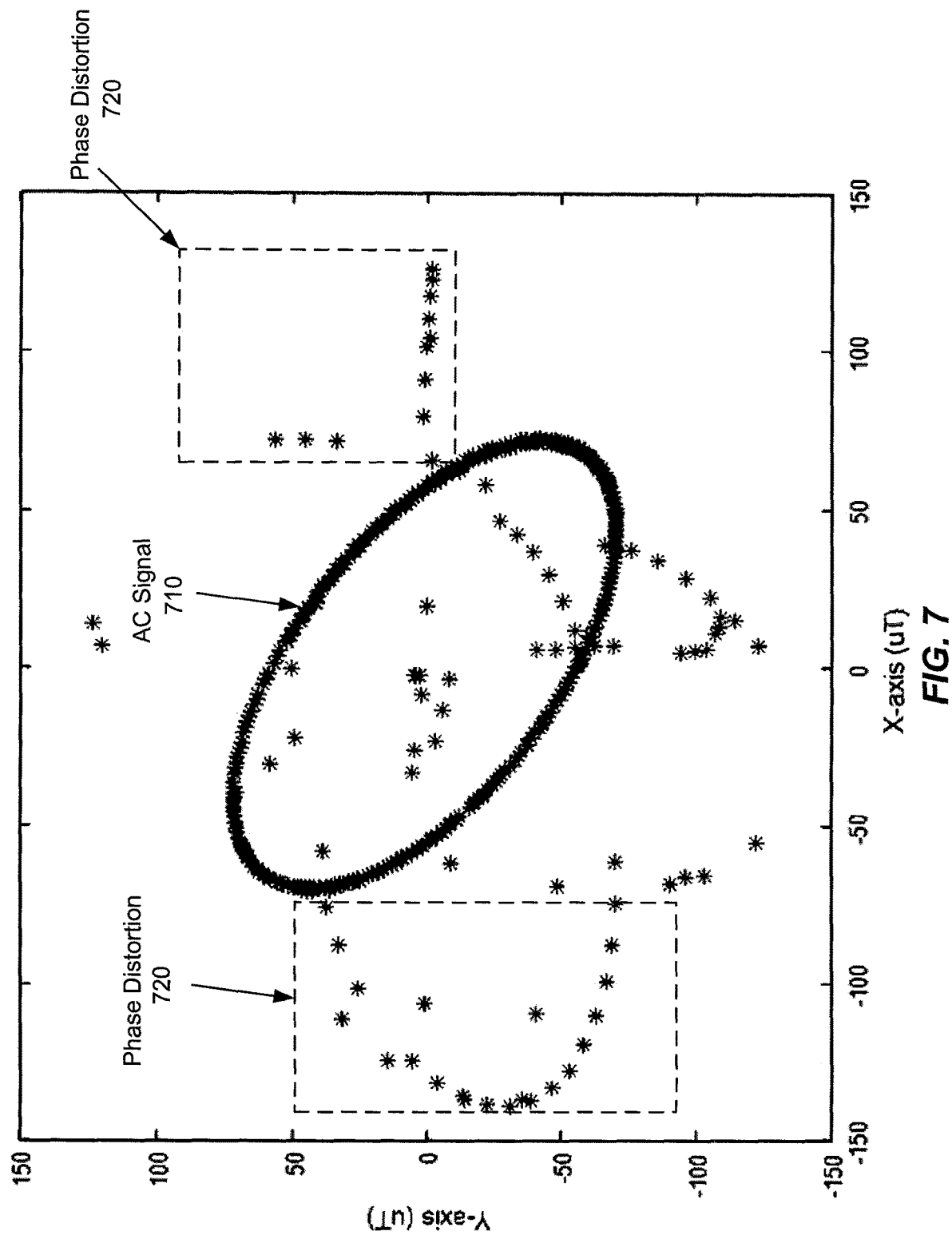
FIG. 7 is a graph of two axes of field intensity of a magnetic field due to the presence of an AC electrical network and a household device, in accordance with an embodiment of the present invention.

FIG. 7 is another graphical representation of a sampled magnetic field in the presence of a nearby AC electrical network and near a running household appliance. The data that follows the elliptical curve, referred to as a Lissajous curve, represents the AC signal 710 resulting from fluctuations in the ambient magnetic field. This data may result, for example, from polling two axes of a built-in magnetometer of a mobile device. The plot shows magnetic field strength in T in the two axes (X and Y). Circuits in the household appliance may cause phase distortion 720 in the AC signal. By analyzing properties of the Lissajous curve, in particular the ratio of the Y-intercept to the Y maximum, a phase shift may be estimated.

FIG. 8 depicts a block diagram of components of a grid management system 110, in accordance with an embodiment of the present invention. It should be appreciated that FIG. 8 provides only an illustration of one implementation and does not imply any limitations with regard to the environments in which different embodiments may be implemented. Many modifications to the depicted environment may be made.

Grid management system 110 may include one or more processors 902, one or more computer-readable RAMs 904, one or more computer-readable ROMs 906, one or more computer readable storage media 908, device drivers 912, read/write drive or interface 914, network adapter or interface 916, all interconnected over a communications fabric 918. Communications fabric 918 may be implemented with any architecture designed for passing data and/or control information between processors (such as microprocessors, communications and network processors, etc.), system memory, peripheral devices, and any other hardware components within a system.

One or more operating systems 910, and one or more application programs 928, for example, outage management program 112, are stored on one or more of the computer readable storage media 908 for execution by one or more of the processors 902 via one or more of the respective RAMs 904 (which typically include cache memory). In the illustrated embodiment, each of the computer readable storage media 908 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Grid management system 110 may also include a R/W drive or interface 914 to read from and write to one or more portable computer readable storage media 926. Application programs 928 on grid management system 110 may be stored on one or more of the portable computer readable storage media 926, read via the respective R/W drive or interface 914 and loaded into the respective computer readable storage media 908.

Grid management system 110 may also include a network adapter or interface 916, such as a TCP/IP adapter card or wireless communication adapter (such as a 4G wireless communication adapter using OFDMA technology). Application programs 928 on grid management system 110 may be downloaded to the grid management system from an external computer or external storage device via a network (for example, the Internet, a local area network or other wide area network or wireless network) and network adapter or interface 916. From the network adapter or interface 916, the programs may be loaded onto computer readable storage media 908. The network may comprise copper wires, optical fibers, wireless transmission, routers, firewalls, switches, gateway computers and/or edge servers.

Grid management system 110 may also include a display screen 920, a keyboard or keypad 922, and a computer mouse or touchpad 924. Device drivers 912 interface to display screen 920 for imaging, to keyboard or keypad 922, to computer mouse or touchpad 924, and/or to display screen 920 for pressure sensing of alphanumeric character entry and user selections. The device drivers 912, R/W drive or interface 914 and network adapter or interface 916 may comprise hardware and software (stored on computer readable storage media 908 and/or ROM 906).

The present invention may be a system, a method, and/or a computer program product at any possible technical detail level of integration. The computer program product may include a non-transitory computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 9:
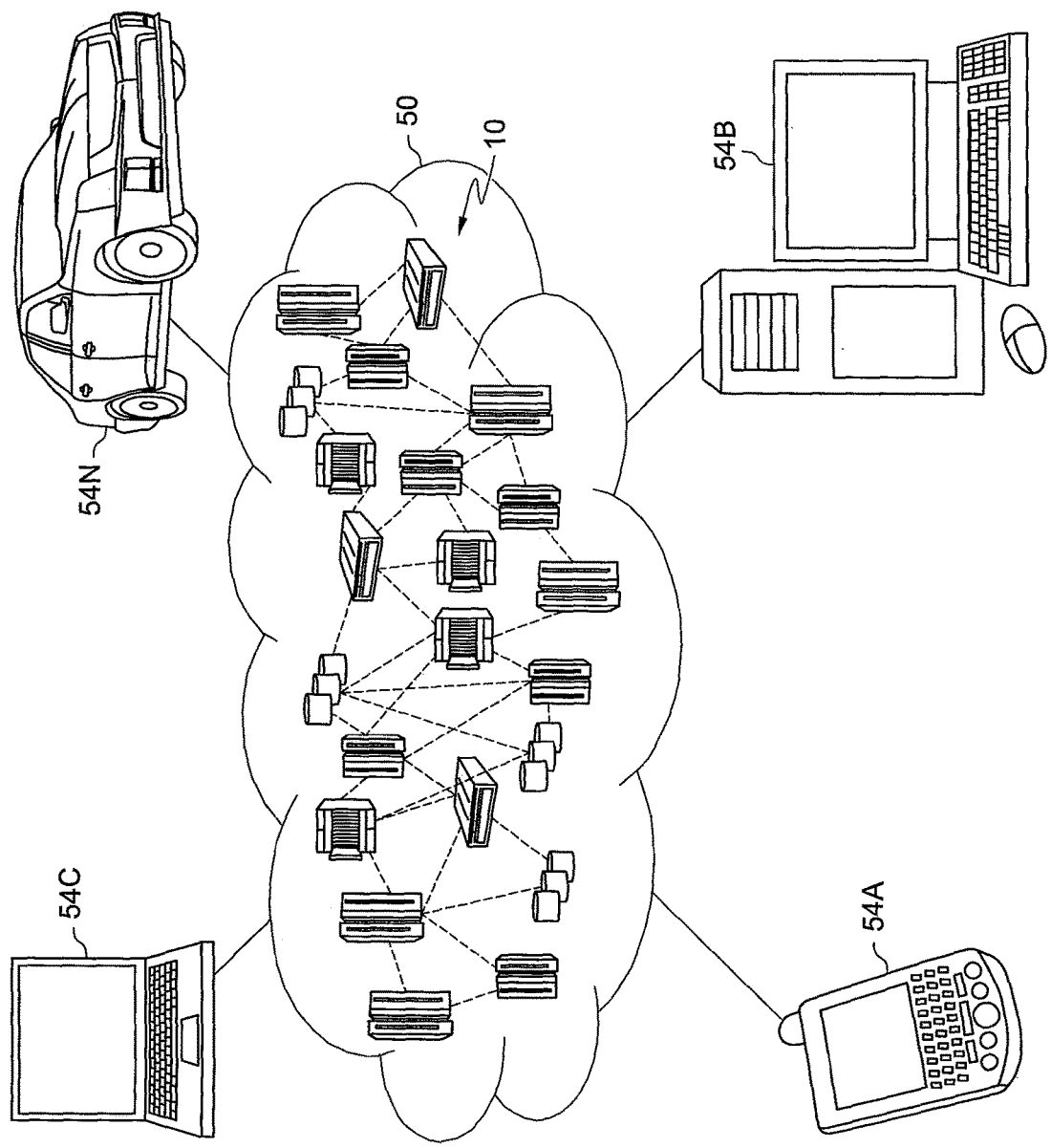
FIG. 9 depicts a cloud computing environment, in accordance with an embodiment of the present invention.

Referring now to FIG. 9, illustrative cloud computing environment 50 is depicted. As shown, cloud computing environment 50 includes one or more cloud computing nodes 10 with which local grid management systems used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local grid management system. It is understood that the types of grid management systems 54A-N shown in FIG. 9 are intended to be illustrative only and that computing nodes 10 and cloud computing environment 50 can communicate with any type of computerized device over any type of network and/or network addressable connection (e.g., using a web browser).

Figure 10:
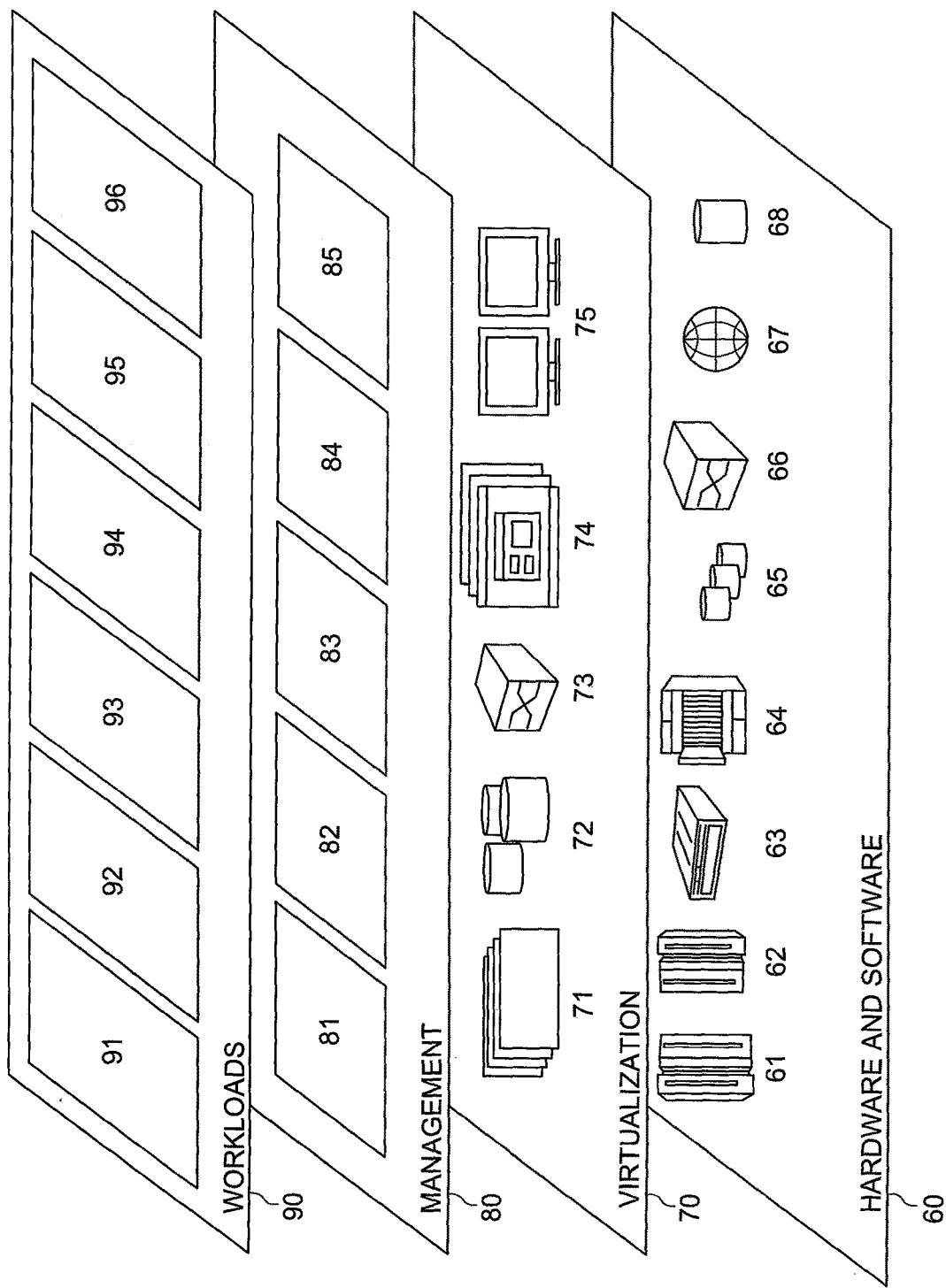
FIG. 10 depicts abstraction model layers, in accordance with an embodiment of the present invention.

Referring now to FIG. 10, a set of functional abstraction layers provided by cloud computing environment 50 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and outage management program 96.

The foregoing description of various embodiments of the present invention has been presented for purposes of illustration and description. It is not intended to be exhaustive nor to limit the invention to the precise form disclosed. Many modifications and variations are possible. Such modification and variations that may be apparent to a person skilled in the art of the invention are intended to be included within the scope of the invention as defined by the accompanying claims.

What is claimed is:

1. A computer implemented method for detecting an outage in an alternating current (AC) electrical network, the method comprising:
   receiving, by one or more processors, one or more time-stamped and location-stamped data packets, each data packet including magnetic sensor data collected by one or more non-contact magnetic sensors in a mobile device in proximity to an AC electrical network, wherein the magnetic sensor data comprises a time series of magnetic field strength readings of an ambient magnetic field from one or more axes of the mobile device, sampled at a constant frequency;
   determining, by the one or more processors, based on a frequency analysis and a phase analysis of the magnetic sensor data, that the outage exists in the AC electrical network, wherein determining that the outage exists in the AC electrical network further comprises generating an outage report for a time-stamped and location-stamped data packet;
   determining, by the one or more processors, an extent of the outage; and
   initiating, by the one or more processors, remedial action to restore power, wherein the remedial action includes dispatching a crew to the outage location and verifying that power has been restored.

2. The method of claim 1, wherein the time stamp includes a time based on one or more of:
   a global positioning system (GPS) pulse-per-second (PPS) signal, a network time protocol (NTP) signal, a precision time protocol (PTP) signal, and a 4G long term evolution (LTE) primary synchronization signal (PSS).

3. The method of claim 1, wherein the location stamp includes a geographic location based on one or more of:
   a GPS location, multilateration, WiFi-based localization, and Global System for Mobile Communications (GSM) localization.

4. The method of claim 1, wherein the outage report is automatically generated by an app running on the mobile device.

5. The method of claim 4, wherein the outage report is received by a grid management program associated with an AC electrical grid operator.

6. The method of claim 4, wherein multiple outage reports are received, further comprising:
   clustering, by one or more processors, the outage reports, based on at least one of:
      geographic location of the mobile devices generating the outage reports, and topology of the AC electrical network;
   determining, by one or more processors, a density of outage reports in a cluster; and
   determining, by one or more processors, that an outage exists in the AC electrical network based on the density exceeding a predetermined threshold.

7. The method of claim 5, wherein multiple outage reports are received, and wherein determining that an outage in the AC electrical network exists comprises applying at least one of an aggregation algorithm and a consensus algorithm to the multiple outage reports.

8. The method of claim 6, further comprising weighting received outage reports according to reliability in determining that an outage in the AC electrical network exists.

9. The method of claim 7, further comprising weighting received outage reports according to reliability in determining that an outage in the AC electrical network exists.

10. The method of claim 1, wherein the frequency analysis and the phase analysis are generated by applying, by the one or more processors, a Fourier analysis to the magnetic sensor data.

11. A computer program product for detecting an outage in an alternating current (AC) electrical network, the computer program product comprising:
   one or more non-transitory computer-readable storage media and program instructions stored on the one or more computer-readable storage media, the program instructions comprising:
   program instructions to receive one or more time-stamped and location-stamped data packets, each data packet including magnetic sensor data collected by one or more non-contact magnetic sensors in a mobile device in proximity to an AC electrical network, wherein the magnetic sensor data comprises a time series of magnetic field strength readings of an ambient magnetic field from one or more axes of the mobile device, sampled at a constant frequency;
   program instructions to determine, based on a frequency analysis and a phase analysis of the magnetic sensor data, that the outage exists in the AC electrical network, wherein the program instructions to determine that the outage exists in the AC electrical network further comprise program instructions to generate an outage report for the time-stamped and location-stamped data packet;
   program instructions to determine an extent of the outage; and
   program instructions to initiate remedial action to restore power, wherein the remedial action includes program instructions to dispatch a crew to the outage location and verifying that power has been restored.

12. The computer program product of claim 11, wherein the time stamp includes a time based on one or more of:
   a global positioning computer program product (GPS) pulse-per-second (PPS) signal, a network time protocol (NTP) signal, a precision time protocol (PTP) signal, and a 4G long term evolution (LTE) primary synchronization signal (PSS).

13. The computer program product of claim 11, wherein the location stamp includes a geographic location based on one or more of:
   a GPS location, multilateration, WiFi-based localization, and Global System for Mobile Communications (GSM) localization.

14. The computer program product of claim 11, wherein the outage report is automatically generated by an app running on the mobile device.

15. The computer program product of claim 14, wherein the outage report is received by a grid management program associated with an AC electrical grid operator.

16. The computer program product of claim 14, wherein multiple outage reports are received, further comprising:
   program instructions to cluster the outage reports based on at least one of:
      geographic location of the mobile devices generating the outage reports, and topology of the AC electrical network;
   program instructions to determine a density of outage reports in a cluster; and
   program instructions to determine that an outage exists in the AC electrical network based on the density exceeding a predetermined threshold.

17. The computer program product of claim 16, wherein program instructions to determine that an outage in the AC electrical network exists comprise program instructions to apply at least one of an aggregation algorithm and a consensus algorithm to the multiple outage reports.

18. The computer program product of claim 16, further comprising program instructions to weight received outage reports according to reliability in determining that an outage in the AC electrical network exists.

19. The computer program product of claim 17, further comprising program instructions to weight received outage reports according to reliability in determining that an outage in the AC electrical network exists.

20. The computer program product of claim 11, wherein the frequency analysis and the phase analysis are generated by applying, by the one or more processors, a Fourier analysis to the magnetic sensor data.

* * * * *